United States Patent [19]
Pruett

[11] 3,720,835
[45] March 13, 1973

[54] SCANNING INFRARED RADIATION SENSOR

[75] Inventor: George R. Pruett, Richardson, Tex.

[73] Assignee: The United States of America as represented by the Secretary of the Army, Washington, D.C.

[22] Filed: Feb. 24, 1967

[21] Appl. No.: 619,138

[52] U.S. Cl.........250/83.3 HP, 313/65 AB, 315/10, 317/235 N
[51] Int. Cl..........................H01j 39/00, H01l 15/00
[58] Field of Search..307/88.5, 311; 317/235, 235 N; 313/65 A; 250/83.3 IR, 83.3 UV, 211, 213, 83.3 H, 83.3 HP, 211 J; 315/10

[56] References Cited

UNITED STATES PATENTS

| 3,322,955 | 5/1967 | Desvignes | 250/209 |
| 2,944,155 | 7/1960 | Mayer | 313/65 A |
| 2,991,366 | 7/1961 | Salzberg | 307/88.5 |
| 3,040,205 | 6/1962 | Walker | 313/65 A |
| 3,283,160 | 11/1968 | Levitt et al. | 307/88.5 |
| 3,290,175 | 12/1966 | Cusano et al. | 317/235 |

*Primary Examiner*—Benjamin A. Borchelt
*Assistant Examiner*—H. A. Birmiel
*Attorney*—Harry M. Saragovitz, Edward J. Kelly, Herbert Berl and Aubrey J. Dunn

[57] ABSTRACT

An infrared image is generated on an oscilloscope by sweeping a spot of short wavelength radiation across a P-N junction in doped germanium while applying voltage across a load resistor to the intensity modulation of an oscilloscope, the current passing through the load resistor being proportional to the intensity of infrared radiation incident on the P-type surface.

4 Claims, 1 Drawing Figure

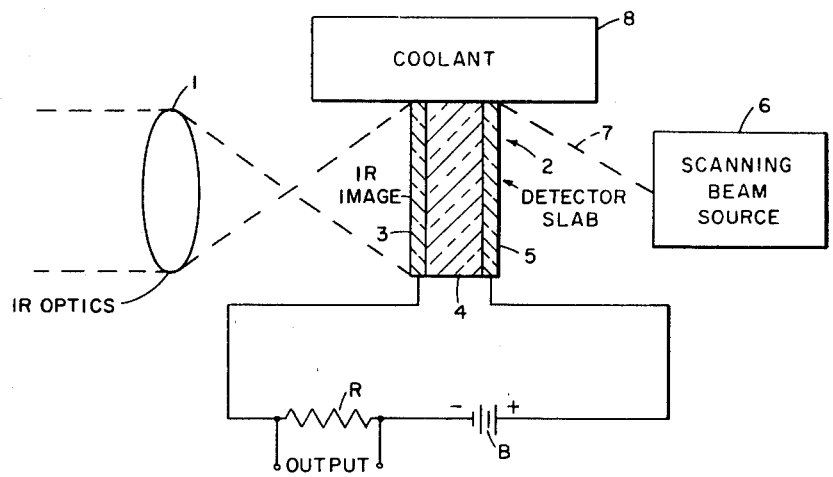

SCANNING INFRARED RADIATION SENSOR

Various types of semiconductor infrared detectors are known, such as those described on pages 89–106 of the book "Infrared Methods" (Library of Congress Catalog Card No. 60-8048) by Conn and Avery, printed in 1963 by the Academic Press of New York and London. None of these semiconductor infrared detectors produce an output which could be used to generate a visible reproduction (scanned or otherwise) of an infrared image. Some types of infrared detectors include image converters for producing visible images. Examples of such detectors are the metascopes, the Evapograph and the Condensograph, and the Barnes Far IR Camera. Another example is the Snooperscope, which uses a 1P25 image converter tube. All of these exemplary infrared imaging devices suffer from one or more deficiencies, but mainly they are not readily adaptable for use as scanning detectors, the output of which could be used as a video signal. The most similar device to the detector of the invention is the television vidicon pickup tube. However, the invention detector differs from a vidicon in that it may employ a light beam in place of the electron beam of the vidicon, and in other ways that will be obvious from the following description.

An object of the invention is to provide a scanning type of infrared sensor.

Another object is to provide a novel infrared detector.

Yet another object is to provide a scanning type of infrared sensor which provides a video output signal.

These objects may be accomplished by the use of a three layer semiconductor detector having an infrared image formed on one of said layers and with a radiation beam scanning another of said layers to produce a video output. In particular, the three layers are in the form of thin slabs of impurity doped germanium, with the first one of said layers being doped with a shallow acceptor type of substitutional impurity having an activation energy small compared to the thermal energy at operating temperature, the second of said layers being doped with an impurity which forms an impurity photoconductor such as mercury, gold, or copper, and with the third layer being doped with a substitutional donor impurity having an activation energy small compared to the thermal energy at operating temperature. THe infrared image is formed on the first layer and the radiation beam is scanned on the third layer. A voltage source is connected between said first and third layers and, through a series load resistor, provides a video voltage output. The radiation beam, in particular, is of a visible wavelength.

The invention may be best understood by reference to the single drawing figure, which FIGURE is a schematic diagram of the invention.

Referring now to the drawing, reference numeral 1 designates an infrared optics system, which may be any of the well known optical systems useable with infrared. This optics system forms an infrared image on one surface of a detector slab 2. This slab consists of three thin layers, with a voltage source B connected to the two outer layers. The first of said layers is designated by the numeral 3 and is germanium doped with an acceptor type of impurity, such as gallium. The second layer is germanium doped with mercury, gold, or copper and is designated 4, and the third layer is germanium doped with a donor type of impurity, such as antimony and is designated 5. The resistivity of the second layer is in the range of megohm-centimeters at operating temperature. Also connected in series with battery B is a resistor R, across which the output voltage for the sensor is taken. The variation of the current in the circuit including said resistor causes variations in the voltage thereacross, and this varying voltage is the output voltage.

On the opposite side of detector slab 2 is a source of scanning radiation designated 6. This source produces a scanning beam (designated by the dotted line 7) which scans slab 2 in a predetermined pattern, such as that pattern employed in television pickup tubes, e.g., a number of spaced parallel lines. As the scanning beam traverses layer 5 of slab 2, a voltage is developed across resistor R in accord with the infrared image on layer 3 of slab 2.

The manner of operation of slab 2 is as follows: the infrared image from the infrared optics 1 is focused on layer 3 of slab 2 and penetrates it (layer 3) uniformly. Majority carriers (holes) are generated in the bulk of layer 4 by the infrared image. The scanning beam 7 on layer 5 of slab 2 may be in the form of visible light. Said beam generates hole-electron pairs. Minority carriers (holes) diffuse through the barrier established by the P-N junction between layers 4 and 5 with no loss in potential. Majority carriers (electrons) are blocked by the P-N junction. The battery B is connected to the layers 3 and 5 by ring contacts to assure good electrical contact. Layer 3 of slab 2 should have as high a conductivity as possible without absorbing or scattering the infrared signal image. The slab 2 is provided with a coolant such as 8 to maintain the low temperature required. This coolant may be, for example, liquid nitrogen in the case of gold-doped germanium, liquid neon in the case of mercury-doped germanium, and liquid hydrogen in the case of copper-doped germanium. Liquid helium, of course, would be a suitable coolant for all types of germanium. The P-N junction established between layer 4 and layer 5 blocks the current that would normally flow between contacts fixed on layers 3 and 5 through the external circuit including resistor R and battery B, except when illuminated by scanning beam 7. The scanning beam generates a current path through layer 5, or, acts as a selective switch. The scanning beam can consist of any energy beam greater than the energy gap of germanium, i.e., it must generate hole-electron pairs at the surface of layer 5 rather than in the bulk. Infrared should be filtered from this scanning beam. Ultraviolet wavelengths would be usable. The means for generating the scanning beam may take only one of several well known forms, such as a cathode ray tube flying spot scanner with suitable optics. The scanning beam could also be a beam of electrons, but a suitable vacuum enclosure would be required.

While a specific embodiment of the invention has been described, other embodiments may be obvious to one skilled in the art, in light of the instant disclosure. While the infrared optics 1 of the drawing has been shown as a double convex refracting lens, other suitable optical elements may be employed, either reflecting or refracting. Also, other elements, e.g. cadmium or zinc may be used as impurities in layer 4 of slab 2.

I claim:

1. A radiation sensor including: a radiation detector comprising first, second, and third continuous semiconductor layers, said first layer being infrared transparent, said second layer being a high resistivity impurity photoconductor contacting said first layer, said third layer being a material of opposite conductivity type from said second layer, and making a broad area contact to form a photodiode with said second layer, bias means connected to said detector, means for directing radiation on said first layer of said detector, means for scanning said third layer of said detector with an energy beam capable of generating hole-electron pairs from the surface of said layer, and output means connected to said bias means.

2. The sensor of claim 1 wherein said semiconductor is germanium.

3. The sensor of claim 1 or 2 wherein said first layer is germanium doped with an acceptor impurity with an activation energy small compared to the thermal energy at operating temperature.

4. The sensor of claim 1 or 2 wherein said third layer is germanium doped with a donor impurity with an activation energy small compared to the thermal energy at operating temperature.

* * * * *